G. ROGGE.
FAUCET.
APPLICATION FILED JULY 25, 1910.
1,035,472.
Patented Aug. 13, 1912.
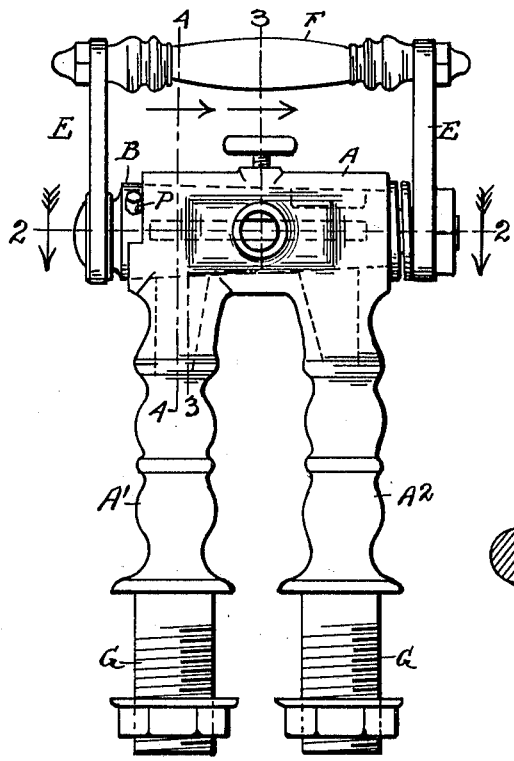
Fig. 1.
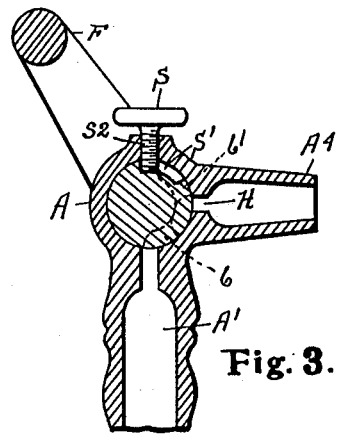
Fig. 3.
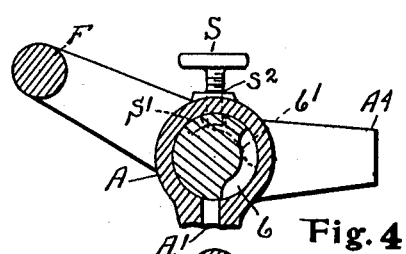
Fig. 4.
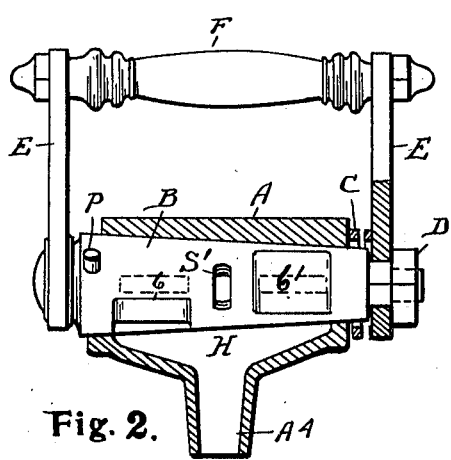
Fig. 2.
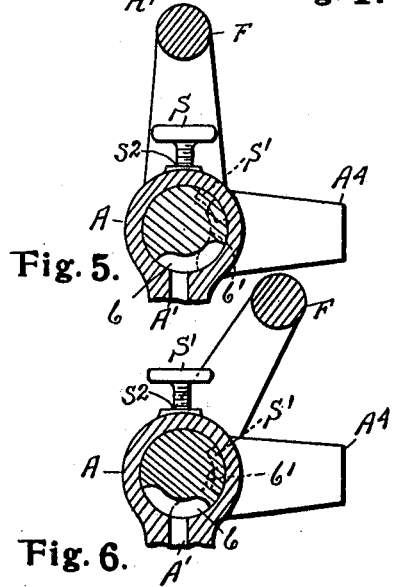
Fig. 5.
Fig. 6.
Witnesses
O. B. Baenziger.
N. W. Biller.
Inventor
Gustave Rogge
By Parker & Burton
Attorneys

UNITED STATES PATENT OFFICE.

GUSTAVE ROGGE, OF DETROIT, MICHIGAN.

FAUCET.

1,035,472.  Specification of Letters Patent.  Patented Aug. 13, 1912.

Application filed July 25, 1910. Serial No. 573,748.

*To all whom it may concern:*

Be it known that I, GUSTAVE ROGGE, a citizen of the United States, residing at Detroit, county of Wayne, State of Michigan, have invented a certain new and useful Improvement in Faucets, and declare the following to be a full, clear, and exact description of the same, such as will enable others skilled in the art to which it pertains to make and use the same, reference being had to the accompanying drawings, which form a part of this specification.

My invention relates to faucets or valves intended for the purpose of delivering liquids from either or both of two receptacles, and it consists in the structure and combinations hereinafter pointed out and specified in the claim.

In the drawings: Figure 1, represents one side of said faucet showing an elevation thereof with some internal construction indicated by dotted lines. Fig. 2, is a horizontal section on the line 2—2, Fig. 1. Fig. 3, is a vertical section on the line 3—3 Fig. 1. Figs. 4, 5, 6, are vertical sections on line 4—4 and show various functions of the improved faucet.

Similar letters refer to similar parts.

The faucet described is of the plug-cock type, and consists of a casing A, in which a tapered plug B is journaled and intended to fit therein liquid-tight, being held under spring tension by means of the spring C and a nut D. The spring being compressed by one of the arms E of the handle F, the other arm E being immovably connected to the other end of the plug B in such manner that the rotation of the handle as indicated in Figs. 3, 4, 5, 6, will rotate the plug B into various positions. The casing A is integrally connected to two tubes, $A^1$, $A^2$, which are adapted to be connected by the usual couplings G, G, to two different receptacles or sources of fluid supply. As there is nothing new in the manner of rotating plug cocks and in the manner of making connections to these sources of supply by means of the tube carrying such plug cocks, and as they are not the essence of this invention, the details thereof are not specifically described; they might be varied in form, shape, and even in the exact manner in which such operative handles are attached or such connections, as G, are made to the source of fluid supply.

The casing A has a nozzle $A^4$, integrally formed therewith which forms an outlet. It is obvious that this nozzle may be of any suitable form or may be continued by connection with pipes so that the discharge may be carried to any convenient point. This nozzle $A^4$ communicates with the longitudinal passage H, shown in dotted lines in Fig. 1, and extending parallel with the axis of the plug B and thus affording the passageway with which the cut-away portions of said plug may in turn communicate, thus affording passage openings from either one or both of the tubes $A^1$, $A^2$, by way of said cut-away portions of said plug to the recess or passage H, and from thence to the nozzle $A^4$.

In the center at the top of the casing A is located a thumb-screw S, which is threaded in a perforation $S^2$ in the casing. The lower end of the screw may or may not extend, depending upon how it is set, into a slot $S^1$ cut circumferentially in the longitudinal center of the plug cock B. The object of this thumb-screw is to at will limit the rotation of the plug B in the manner and for the purpose hereinafter described, it being obvious that when the thumb-screw S is partially withdrawn so that its lower end does not engage in the slot $S^1$ that it has no effect whatever upon the rotation of the plug B, whereas if it be turned down far enough so as to engage in the slot $S^1$ it would limit that rotation to an amount depending upon the length of the slot. The object of this construction for the purpose of limiting the rotation of the plug B is to prevent the cock or valve from connecting with more than one of the pipes leading to a liquid supply.

In Fig. 2, there are shown two cut-away portions at different angles to each other, which portions are lettered $b$ $b^1$. When the handle is in the position as represented in Fig. 3, the cut-away portion $b$ communicates with the inlet pipe $A^1$, and with the outlet $A^4$, and, as shown in Fig. 3 if the thumb-screw is depressed so as to engage the slot $S^1$, communication can be had only between the conduits $A^1$ and nozzle $A^4$, and when the handle is depressed, as shown in Fig. 4, it will be noted that the thumb-screw engaging the slot $S^1$ so limits the movement that the cut-away portion $b$ only communicates with the nozzle $A^4$, and the plug cock cuts off communication from the conduit $A^1$. This limitation of motion in that direction can also be made permanent by means of a projection P, shown in Fig. 1, as when in the position shown in Fig. 4, all the orifices leading from source of liquid supply are closed by the valve. When the handle is in the position shown in Fig. 5, the cut-away portion or slot $b$, communicates with the source of supply $A^1$, but does not communicate with the nozzle $A^4$. The other cut-away portion $b^1$ in the plug B shown in dotted lines in Fig. 5, communicates with the nozzle $A^4$, but does not communicate with the source of supply. When the handle is in position shown in Fig. 6, the cut-away portion $b^1$ of the plug B is in communication with the conduit $A^2$, and also with the nozzle $A^4$. It is obvious by adjusting the movement of the plug B that the cut-away portions $b$ $b^1$ therein can be made to communicate with the conduits $A^1$, $A^2$, respectively and with the nozzle $A^4$ as such cut-away portions will overlap the respective openings from each of the conduits and also overlap the opening leading to $A^4$. This opening H leading to $A^4$ is a longitudinal slot as shown in dotted lines in Fig. 1, and in cross section in Fig. 3, and is long enough to communicate with the cut-away portions $b$ $b^1$ of the plug B. It is obvious by this arrangement that the plug can be made to communicate with either one of the conduits $A^1$, $A^2$, and deliver from either one through the same nozzle $A^4$, or can be limited by means of a thumb-screw to a communication with the single conduit $A^1$, or can be made to communicate with both conduits $A^1$, $A^2$ so as to mix in varying proportions the liquids coming from the said conduits and deliver such liquids through the common nozzle $A^4$.

The mode of operation is, in view of the foregoing description, unnecessary to state, as it is sufficiently obvious therefrom.

What I claim is:

A faucet, having in combination, a hollow casing provided with a pair of intakes, an outlet and a threaded perforation, a set screw engaging the threaded perforation, a plug rotatable in said casing, and provided with a cut-away portion adapted to connect the outlet and one intake, and a cut-away portion adapted to connect the outlet and the other intake, the said plug being provided with a slot into which the set screw may be turned, the said cut-away portions being so arranged with respect to the slot that turning the set screw into the slot will prevent communication between one of the intakes and the outlet, substantially as described.

In testimony whereof, I sign this specification in the presence of two witnesses.

GUSTAVE ROGGE.

Witnesses:
R. A. PARKER,
N. V. BELLES.

---

Copies of this patent may be obtained for five cents each, by addressing the "Commissioner of Patents, Washington, D. C."